United States Patent [19]

Browne

[11] 4,234,950
[45] Nov. 18, 1980

[54] TELEPHONE STATION CARRIER SYSTEM

[76] Inventor: Sidney Browne, 6307 Crosswoods Cir., Falls Church, Va. 22044

[21] Appl. No.: 33,248

[22] Filed: Apr. 25, 1979

[51] Int. Cl.³ .............................................. H04J 1/06
[52] U.S. Cl. ................................. 370/71; 179/170 R
[58] Field of Search ......... 179/15 FD, 15 FS, 15 BP, 179/2.5 R; 325/184

[56] References Cited

U.S. PATENT DOCUMENTS 3,804,988  4/1974  Browne ............................ 179/2.5 R Primary Examiner—Bernard Konick
Assistant Examiner—Joseph A. Popek
Attorney, Agent, or Firm—Ira C. Edell

[57] ABSTRACT

A station carrier telephone system employing single sideband transmission permits optimal utilization of the available frequency spectrum without requiring individual stable subscriber carrier sources by utilizing a common source signal for all subscriber carriers. The common source signal is received via the common transmission line at each subscriber circuit where it is processed and mixed with the similarly received central office carrier to derive a difference frequency signal which serves as the subscriber carrier. In a preferred embodiment sixteen channels share the common transmission line and employ sixteen adjacent subscriber frequency bands and sixteen adjacent central office frequency bands.

22 Claims, 4 Drawing Figures

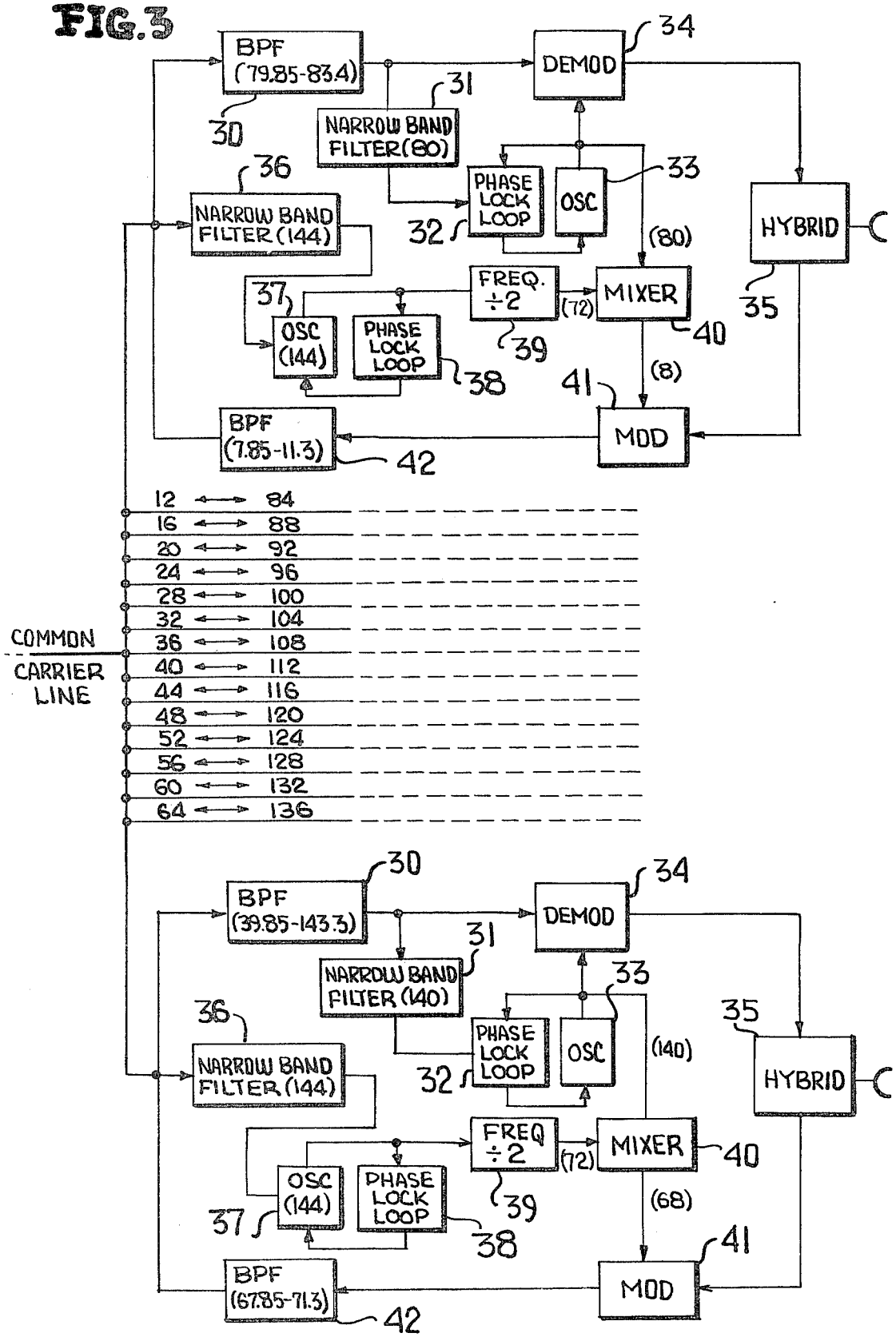

TELEPHONE STATION CARRIER SYSTEM

DESCRIPTION

Technical Field

The present invention relates to telephony and more particularly to an improved frequency multiplexed telephone system which affords optimum utilization of the available frequency spectrum at relatively low cost.

BACKGROUND ART

In my prior U.S. Pat. No. 3,804,988 I disclose a station carrier telephone system in which single sideband (SSB) amplitude modulation (AM) transmission is employed with the carrier being inserted in the transmitted signal to serve as a demodulation reference at the receiving end. In each channel, the subscriber carrier is an integral submultiple of the central office carrier, permitting the subscriber carrier to be derived from the central office carrier by frequency division and eliminating the need for a separate subscriber carrier source. A specific embodiment disclosed in that patent provides for a twelve channel system utilizing various 4 KHz frequency bands between 8 KHz and 136 KHz. It is desirable to provide additional channels for such a system is possible. However, in order to satisfy the requirement of a sub-multiple relationship between the central office and subscriber carrier frequencies, it becomes necessary to extend the frequency spectrum employed up toward and, in some cases, beyond 200 KHz. These higher carrier frequencies fall outside the range of the various frequency standards promulgated by the U.S. Rural Electrification Administration and other such agencies for station carrier equipment.

It is therefore an object of the present invention to provide both a method and apparatus for permitting optimal utilization on an available frequency spectrum for a station carrier telephone system.

It is a more specific object of the present invention to provide a single sideband station carrier telephone system in which there is no requirement for stable oscillators at subscriber circuits and which optimizes the utilization of the available frequency spectrum.

It is a further object of the present invention to provide a single sideband station carrier telephone system of the type described in which the subscriber and central office transmission bandwidths are the same size, thereby permitting the use of frogging repeaters along the transmission line.

DISCLOSURE OF THE INVENTION

In accordance with the present invention I employ a common source signal from which all subscriber carrier signals are derived. The common source signal is selected so that the frequency difference between the common source signal and the received central office carrier at each subscriber circuit is equal to the desired subscriber carrier. By this approach I can employ the maximum number of single sideband channels possible in a given frequency spectrum. In a specific preferred embodiment I employ sixteen such channels within the ranges of 8 to 68 KHz for subscriber carriers and 80 to 140 KHz for central office carriers. In the general case, if N is the desired number of channels, $f_{S1}$ is the lowest subscriber carrier frequency, and F is the required spacing between adjacent carriers, the common source frequency would be given by $f_x = f_{S1} + N$; the lowest central office carrier frequency would be given by $f_{C1} = 2f_{S1} + FN$; and the highest central office carrier frequency would be given by $f_{CN} = 2f_{S1} + 2FN - F$. In any case, only one highly stable frequency source is required for all N channels and it may be located at the easily accessible central office location.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 3 is a block diagram of the circuitry employed at the subscriber circuits in the system of the preferred embodiment; and FIG. 4 is a block diagram of a "frogging"-type repeater employing the principles of the present invention.

BEST MODE OF CARRYING OUT THE INVENTION

Figure 1:
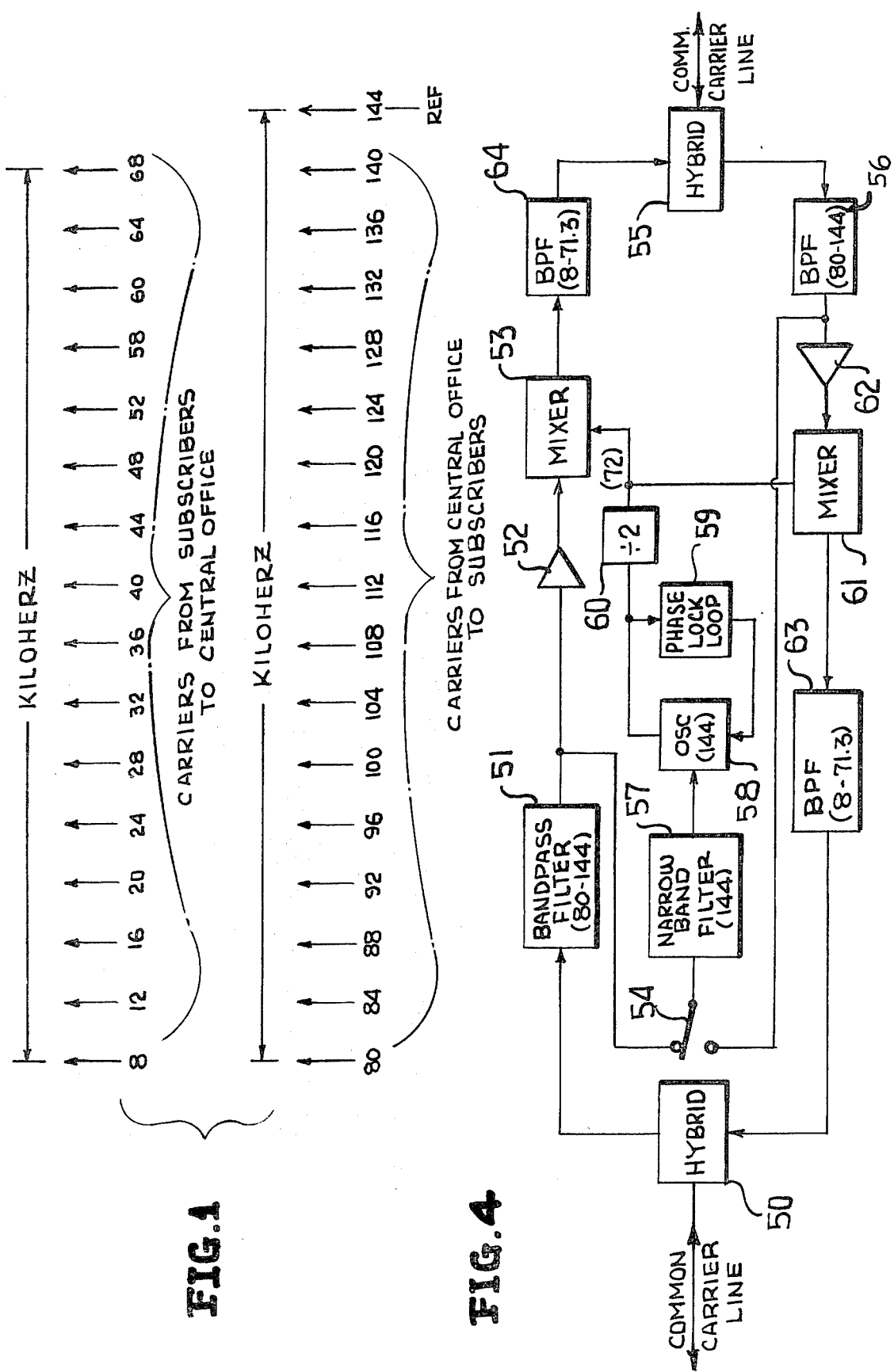
FIG. 1 is a diagrammatic representation of a frequency standard to which the preferred embodiment of the present invention conforms.

The frequency standard illustrated in FIG. 1 is compatible with one which has been proposed for adoption by the U.S. Rural Electrification Administration (REA) and others. It is shown here by way of example only to illustrate how the present invention can be adopted to any such standard to make optimum use of the available frequency spectrum. It is noted that the allocated subscriber carrier frequencies range from 8 KHz to 68 KHz, that the allocated central office carrier frequencies range from 80 KHz to 140 KHz, that a reference is available at 144 KHz, and that the spacing between carrier frequencies is 4 KHz. It is within this overall range from 8 KHz to 144 KHz that the present invention is capable of employing sixteen station carrier channels. It is to be noted that it is impossible to employ sixteen channels in the available spectrum if double sideband transmission is used since adjacent carriers under such circumstances must be separated by 8 KHz. If prior art single sideband techniques are used (apart from those techniques described in my prior U.S. Pat. No. 3,803,988) it is necessary to provide a stable oscillator at each subscriber circuit, thereby rendering such a system unduly expensive. As mentioned above, using the technique described in my aforesaid patent, wherein the subscriber carrier frequencies are integral submultiples of the central office carrier frequencies, results in the central office carrier frequencies residing well above the range of the spectrum illustrated in FIG. 1. In addition, the aforementioned technique has different bandwidth requirements for each transmission direction, thereby precluding the use of frequency frogging repeaters.

Figure 2:
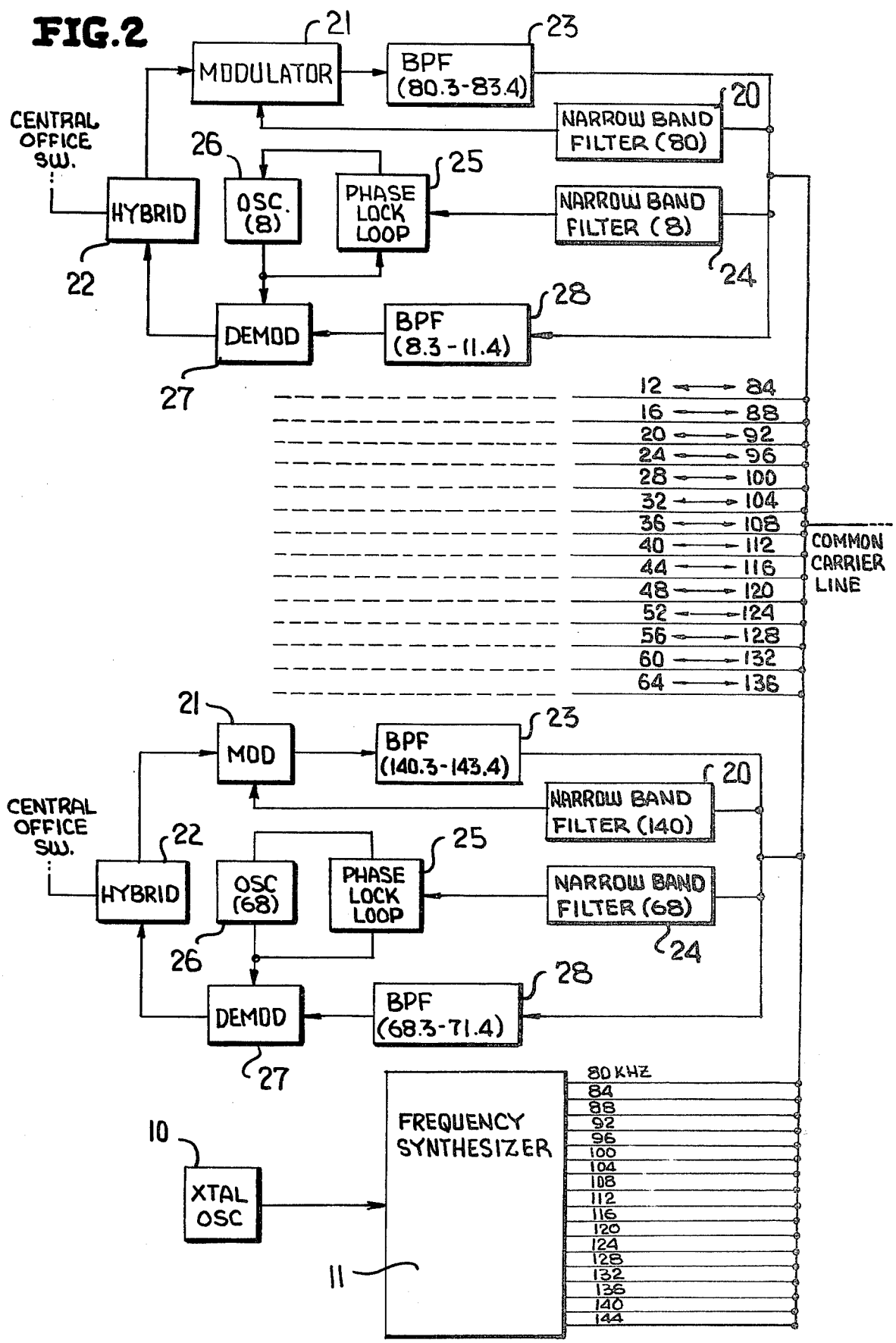
FIG. 2 is a block diagram of the circuitry employed at the central office circuits in the system of the preferred embodiment.

In FIGS. 2 and 3 there is illustrated a sixteen channel station carrier system operating within the spectrum of FIG. 1. FIG. 2 illustrates the circuitry employed at the central office location and includes a single crystal oscillator 10 and a frequency synthesizer 11. The crystal oscillator is the primary frequency standard for the entire sixteen-channel system. The oscillator frequency is commutated by synthesizer 11 to yield all sixteen of the central office carriers (80 KHz through 140 KHz) illustrated in FIG. 1 as well as the reference signal (144 KHz). These sixteen carriers and reference signal are applied directly to the common carrier line extending between the central office location and the various subscriber locations. In this manner, by selective filtering, any central office carrier may be received at any individual central office or subscriber circuit.

The sixteen central office circuits are identical to one another except for operating frequencies and the bandwidths of the various filters employed. Consequently, only the individual central office circuits employing the lowest and highest central office carrier frequencies are illustrated in detail in FIG. 2; the remaining fourteen central office circuits being shown as individual lines with appropriate subscriber and central office carrier frequency designations. The lowest frequency circuit includes a narrow band filter 20 which, in this case, is tuned to pass only the 80 KHz tone from frequency synthesizer 11 to a single sideband amplitude modulator 21. Modulator 21 also receives audio signals (generally in the range from 300 Hz to 3.4 KHz) from a hybrid coupler 22 which, in a well known manner, both receives audio signals from and applies audio signals to its own line connected to the central office switching equipment. Modulator 21 passes the upper sideband (for example) and the central office carrier tone (80 KHz) to a bandpass filter 23 having an appropriate passband. In this case, the appropriate passband is flat (i.e. the gain versus frequency characteristic is flat) from 80.3 KHz to 83.4 KHz, thereby permitting filter 23 to pass only the single sideband to the common carrier line.

Another narrow band filter 24 is tuned to receive the appropriate subscriber carrier (in this case 8 KHz) from the common transmission line. Derivation of the subscriber carrier is described below in relation to FIG. 3. The subscriber carrier is passed to a phase lock loop 25 which operates in conjunction with an oscillator 26 to phase and frequency lock the oscillator output signal to the phase and frequency of the subscriber carrier passed by filter 24. The output signal from oscillator 26 is used as a demodulation signal at demodulator 27. It will be recognized that, in some instances, it may be possible to utilize the subscriber carrier as passed by filter 24 directly as the demodulation signal at demodulator 27, thereby eliminating the need for oscillator 26 and phase lock loop 25; however, in application where the subscriber carrier is likely to be distorted during transmission, reconstitution of the carrier by means of the relatively inexpensive phase lock arrangement is highly desirable. As a further alternative, the filter 24, loop 25 and oscillator 26 may be eliminated and replaced by a simple mixer which would receive the output from filter 20 and a 72 KHz signal generated at synthesizer 11 and provide the difference frequency as the demodulation signal. Demodulator 27 receives a single sideband subscriber signal passed from the common carrier line by bandpass filter 28. The passband of this filter is 8.3 to 11.4 KHz which corresponds to the single sideband transmitted from the appropriate subscriber circuit as described below. This sideband is demodulated at demodulator 27 and passed to the central office switching equipment via hybrid coupler 22.

The central office circuit employing the highest frequencies is shown in FIG. 2 as having the same components as the circuit described above, which components bear the same reference numerals as the components described above. The differences relate solely to the fact that the central office carrier frequency for the highest frequency circuit is 140 KHz and the subscriber carrier frequency for that circuit is 68 KHz. Therefore, narrow band filter 20 passes 140 KHz, narrow band filter 24 passes 68 KHz, oscillator 26 is controlled to operate at 68 KHz, filter 23 has a passband of 140.3–143.4 KHz, and filter 28 has a passband of 68.3 to 71.4 KHz.

Referring to FIG. 3, the lowest frequency subscriber circuit (at the top of the drawing) includes a bandpass filter 30 which receives the lowest frequency central office carrier and single sideband from the common carrier line. Filter 30 for this circuit, therefore, has a flat passband from 79.85 KHz to 83.3 KHz. The signal passed by filter 30 is applied to both a single sideband demodulator 34 and a narrow band filter 31. Filter 31 is tuned to the appropriate central office carrier frequency, in this case 80 KHz. Alternatively, filter 31 can receive the central office carrier directly from the common carrier line, thereby permitting filter 30 to have the smaller bandwidth of 80.3 to 83.4 KHz. The received central office carrier passed by filter 31 controls the frequency of an oscillator 33 with the aid of phase lock loop 32 so that a reconstituted 80 KHz signal is used to demodulate the single sideband at demodulator 34. The demodulated audio signal is then passed to the receiving portion of the subscriber hybrid 35.

Each subscriber circuit also includes a narrow band filter 36 tuned to pass the 144 KHz reference signal from the common carrier line. This reference signal is also reconstituted by means of oscillator 37 and phase lock loop 38 to eliminate any distortion in the reference signal as received. The reconstituted reference signal at a frequency of 144 KHz is frequency-divided by divider 39 to 72 KHz and then this 72 KHz signal is applied to frequency mixer 40. Mixer 40 also receives the reconstituted central office carrier signal (80 KHz in this case) from oscillator 33 and provides a difference frequency which serves as the subscriber carrier for this circuit. As shown, this difference frequency for the lowest frequency subscriber circuit is 8 KHz. The subscriber carrier is applied to a single sideband amplitude modulator 41 to modulate audio signal received from the transmitter of hybrid 35. The resulting single sideband (again, the upper sideband by way of example) and the subscriber carrier are passed by a bandpass filter 42 to the common carrier line. Filter 42 has a flat passband for this purpose from 7.85 KHz to 11.4 KHz.

The highest frequency subscriber circuit, except for its operation at different frequencies, is identical to the lowest frequency subscriber circuit and the components thereof bear identical reference numerals. The central office carrier frequency for this circuit is 140 KHz and the subscriber carrier frequency is at 68 KHz. It is seen, therefore, that the lowest frequency subscriber circuit communicates with the lowest frequency central office circuit, the highest frequency subscriber circuit communicates with the highest frequency central office circuit, etc. In the highest frequency subscriber circuit: filter 31 has a flat passband from 139.85 KHz to 143.4 KHz; filter 42 has a flat passband from 67.85 to 71.4 KHz; and narrow band filter 31 is tuned to 140 KHz. It is noted that narrow band filter 36 is tuned to reference frequency 144 KHz in all of the subscriber circuits.

There are sixteen such identical subscriber circuits, the other fourteen being diagrammatically designated by signal lines showing the central office and subscriber carrier frequencies. A common relationship exists between the subscriber carrier frequency and central office carrier frequency in each channel, namely: the difference between these two frequencies is 72 KHz, which is the frequency with which the central office carrier is mixed at mixer 40 in each subscriber circuit.

It should be noted that the limits of the passbands of the various bandpass filters can be changed, depending upon the particular approach employed. For example, narrow band filter 31 as shown in FIG. 3, receives its input signal from bandpass filter 30. Therefore, the passband of filter 30 must extend below the carrier frequency to assure that the carrier is passed by that filter. Alternatively, filter 31 could take its input signal directly from the transmission line, in which case the lower end of the passband of filter 30 could be raised to above the carrier. Similar considerations apply to the passbands for filters 23, 28 and 42.

The specific embodiment described above is intended for a system wherein the spacing between adjacent carrier frequencies is 4 KHz, wherein sixteen channels are required and wherein the lowest subscriber carrier frequency is 8 KHz. These limitations may not always obtain, wherefore it is desirable to have a more general design approach for a carrier system having substantially any given conditions. Assume that $f_{S1}$ is the lowest subscriber carrier frequency, F is the spacing between adjacent carrier frequencies, and N is the number of channels in the system. Then, any subscriber carrier frequency $f_{Sn}$ between the first and the Nth subscriber carrier may be found from the expression:

$$f_{Sn} = f_{S1} + F(n-1) \tag{1}$$

where n is the nth term in the sequence of subscriber carriers and is any integer between 1 and N. The difference frequency $f_X$ between the central office carrier and the subscriber carrier in each channel may be found from the expression:

$$f_X = f_{S1} + FN \tag{2}$$

The nth frequency $f_{Cn}$ in the sequence of central office carrier frequencies may be found from the expression:

$$f_{Cn} = 2f_{S1} + FN + F(n-1) \tag{3}$$

By way of example, assume that the spacing between adjacent carrier frequencies is 3.5 KHz, that the lowest subscriber carrier frequency is 7 KHz, and that eighteen channels are desired. From expression (1) we note that the highest subscriber carrier frequency (n=18) is 66.5 KHz. From expression (2) we note that the difference frequency between the subscriber and central office carriers in each channel is 70 KHz. From expression (3) we note that the lowest central office carrier frequency is 77 KHz and that the highest central office carrier frequency is 136.5 KHz.

It should be noted that the difference frequency (72 KHz in FIG. 3; $f_X$ in the expression (2) above) is not transmitted directly in FIGS. 2 and 3. Instead, twice that frequency (144 KHz) is employed and this is divided down by frequency divider 39. This is a matter of choice and, in fact 72 KHz could be generated directly at frequency synthesizer 11 if desired rather than employ divider 39 in each subscriber circuit. However, where frogging repeaters are used on the common line, the use of 72 KHz is undesirable as it falls inside the guard band between the two transmission bands.

In transmission lines between central office stations frequency frogging repeaters are often employed to prevent singing, reduce crosstalk and correct for variable delay versus frequency characteristics along the line. This is accomplished by having modulators in the repeater translate a low frequency group of signals to a high frequency group and vice versa. Because of this frequency-inversion process, both central office stations transmit only high frequency group signals and receive only low frequency group signals, or vice versa. Singing and crosstalk are minimized because the high level output group at either end is a different frequency range than the low level input group at that end. The techniques of the present invention are useful in such frequency-frogging repeater, one example being illustrated in FIG. 4. Specifically, assume that the repeater section of FIG. 4 is located between the central office equipment of FIG. 2 and another central office station. The signals received at the left end (as viewed in FIG. 4) at hybrid coupler 50 are therefore in the higher frequency group between 80–144 KHz. These signals are to be translated to the 8–71.4 KHz range and transmitted on to the other central office location. Signals in the 80–144 KHz range and travelling from right to left (as viewed in FIG. 4) are received by hybrid coupler 55 and are translated down to the 8–71.4 KHz range for reception by the central office circuits. Signals received by hybrid coupler 50 are passed to a bandpass filter 51 having a flat response between 80 and 140 KHz. The output signal from filter 51 is amplified by amplifier 52 and applied to a frequency mixer 53. The output signal from filter 51 is also applied via switch 54 to a narrow band filter 57 which is tuned to 144 KHz. The position of switch 54 is selected by installation or maintenance personnel on the basis of operating requirements. In any case, the 144 KHz tone is filtered from the selected signal by narrow band filter 57 and used to synchronize oscillator 58 in conjunction with phase lock loop 59. The reconstituted 144 KHz signal is frequency-divided by two to 72 KHz by divider 60 and applied to both mixers 53 and 61. At mixer 53, the left to right 80–144 KHz band is translated down to 8–71.4 KHz by taking the difference between the 80–144 KHz band from filter 51 and the 72 KHz tone from divider 60. At mixer 61 the right to left 80–144 KHz band from filter 56 and amplifier 62 is translated down to 8–71.4 KHz. The right to left band is passed through filter 63, which has a flat passband from 8–71.4 KHz, to hybrid coupler 50 and transmitted on the common carrier line. The left to right band is passed through filter 64, which is likewise flat from 8–71.4 KHz, and passed by hybrid coupler 55 onto the common carrier line.

Thus, the frequency frogging repeater of FIG. 4 permits simple and inexpensive frogging and is totally symmetrical in that it operates regardless of which way it is connected into the line. Switch 54 permits the central office station at either end of the line to serve as the master or slave, depending upon which station is to supply the 144 KHz tone.

It is to be understood that the principles of the present invention also apply to applications wherein the central office carrier frequencies are in a lower frequency band than the subscriber carrier frequencies. In such case, the subscriber carrier frequencies would be derived as the sum, rather than the difference, between the central office carrier frequencies and the common translating signal frequency.

While I have described and illustrated one specific embodiment of my invention it will be clear that variations of the details of construction which are specifically illustrated and described may be resorted to without departing from the true spirit and scope of the invention as defined in the appended claims.

I claim:

1. In a frequency-multiplexed carrier system of the type employing a common transmission line to service a plurality of remote subscriber circuits from a respective plurality of local circuits at a central location, each remote subscriber circuit being paired with a respective local circuit with which it alone communicates, a method comprising the steps of:

generating at said central location a frequency-stable first carrier signal for each local circuit, the first carrier signal for each local circuit having a different frequency, the frequencies of all of said first carrier signal residing in a first band of frequencies;

modulating said first carrier signal at each local circuit with externally-derived intelligence signals to derive a single sideband of said first carrier signal, the frequency bandwidth of said intelligence signals being less than the spacing between adjacent first carrier signal frequencies;

transmitting, from said central location to said remote circuits via said common transmission line, all of said first carrier signals and all of said single sidebands of said first carrier signals;

at each remote circuit, receiving from said common transmission line the first carrier signal and single sideband thereof for the local circuit with which that remote circuit is paired;

at each remote circuit, demodulating the received single sideband with the received first carrier signal to recover the externally-derived intelligence signals;

for all of said remote circuits, generating a translating signal having the same frequency at each remote circuit;

at each remote circuit, frequency-mixing said translating signal and the received first carrier signal to derive a second carrier signal, the second carrier signals at each remote circuit having different frequencies which reside in a second band of frequencies which does not overlap said first band of frequencies, the frequency difference between the received first carrier signal and the derived second carrier signal being equal to the frequency of said translating signal at all of said remote circuits;

modulating said second carrier signal at each remote circuit with externally derived further intelligence signals to derive a single sideband of said second carrier signal, the frequency bandwidth of said further intelligence signals being less than the spacing between adjacent second carrier signal frequencies;

transmitting from each remote circuit to said central location via said common transmission line, said derived single sideband of said second carrier signal;

at each local circuit, receiving from said common transmission line the single sideband of said second carrier signal transmitted from the remote circuit with which that local circuit is paired;

providing at each local station a second carrier signal to demodulate the received single sideband; and at each local circuit, demodulating the received single sideband with the received second carrier signal to recover said further intelligence signal.

2. The method according to claim 1 wherein the frequency spacing between adjacent first carrier signals in said first band is the same throughout said first band and the same as the frequency spacing between adjacent second carrier signals throughout said second band.

3. The method according to claims 1 or 2 wherein the nth second carrier signal frequency in order of increasing frequencies in said second band is represented by $f_{Sn} = f_{S1} + F(n-1)$, where F is the frequency spacing between adjacent carrier signal frequencies in said first and second bands and $f_{S1}$ is the frequency of the lowest-frequency second carrier signal.

4. The method according to claim 3 wherein the nth first carrier signal frequency in order of increasing frequencies in said first band is represented by $f_{Cn} = 2f_{S1} + FN + F(n-1)$, where N is equal to the number of said remote circuits.

5. The method according to claim 4 wherein the frequency of said translating signal is represented by $f_X = f_{S1} + FN$.

6. The method according to claim 5 wherein the step of generating said translating signal comprises the steps of:

at said central location, generating a frequency-stable common source signal having a frequency twice that of said translating signal and higher than the highest first carrier signal frequency by the amount F;

transmitting said common source signal to said remote circuits via said common transmission line; and at each remote circuit, receiving said common source signal and frequency-dividing it by two to provide said translating signal.

7. The method according to claim 6 wherein the steps of generating said first carrier signals and said common source signal include the steps of:

generating a frequency-stable clock signal at a higher frequency than that of all of said first carrier, second carrier and common source signals; and frequency-synthesizing said clock signal to derive all of said first carrier signals and said common source signal.

8. The method according to claim 5 wherein N=16, $f_{S1}$=8 kilohertz, and F=4 kilohertz.

9. The method according to claim 8 wherein the derived single sidebands of said first carrier signals and the derived single sidebands of said second carrier signal are upper sidebands.

10. The method according to claim 1 wherein the step of generating said translating signal comprises the steps of:

at said central location, generating a common source signal having a frequency which is an integral multiple of the translating signal frequency and higher than frequencies of any of said first and second carrier signals by at least the bandwidth of said intelligence signals;

transmitting said common source signal to each remote circuit via said common transmission line; and at each remote circuit receiving said common source signal and frequency-dividing it by a predetermined factor to provide said translating signal, said predetermined factor being such that the frequency of said translating signal falls between said first and second bands.

11. The method according to claim 10 wherein the steps of generating said first carrier signals and said common source signal include the steps of:
generating a frequency-stable clock signal at a higher frequency than that of all of said first carrier, second carrier and common source signals; and
frequency-synthesizing said clock signal to derive all of said first carrier signals and said common source signal.

12. A frequency-multiplexed carrier system of the type employing a common transmission line to service a plurality of remote stations from a respective plurality of local stations at a central location, each remote station being paired with a respective local station with which it alone communicates, said system being characterized by:
generator means for generating at said central location a frequency-stable first carrier signal for each local station, the first carrier signal for each local station having a different frequency, the frequencies of all of said first carrier signals residing in a first band of frequencies;
modulator means for modulating said first carrier signal at each local station with externally-derived intelligence signals to derive a single sideband of said first carrier signal, the frequency bandwidth of said intelligence signals being less than the spacing between adjacent first carrier signal frequencies;
transmitter means for transmitting, from said central location to said remote stations via said common transmission line, all of said first carrier signals and all of said single sidebands of said first carrier signals;
receiver means at each remote station for receiving from said common transmission line the first carrier signal and single sideband thereof for the local station with which that remote station is paired;
demodulator means at each remote station for demodulating the received single sideband with the received first carrier signal to recover the externally-derived intelligence signals;
means for providing at all of said remote stations, a common translating signal having the same frequency at each remote station;
mixer means at each remote station for frequency-mixing said translating signal and the received first carrier signal to derive a second carrier signal, the second carrier signals at each station having different frequencies which reside in a second band of frequencies which does not overlap said first band of frequencies, the frequency difference between the received first carrier signal and the derived second carrier signal being equal to the frequency of said translating signal at all of said remote stations;
further modulator means for modulating said second carrier signal at each remote station with externally derived further intelligence signals to derive a single sideband of said second carrier signal, the frequency bandwidth of said further intelligence signals being less than the spacing between adjacent second carrier signal frequencies;
further transmitter means for transmitting, from each remote station to said central location, via said common transmission line, the derived single sideband of said carrier signal;
further receiver means at each local station for receiving from said common transmission line the single sideband of said second carrier signal transmitted from the remote station with which that local station is paired;
means for providing at each local station a second carrier signal to demodulate the received single sideband; and
further demodulator means at each local station for demodulating the received single sideband with the second carrier signal to recover said further intelligence signal.

13. The system according to claim 12 wherein the frequency spacing between adjacent first carrier signals in said first band is the same throughout said first band and the same as the frequency spacing between adjacent second carrier signals throughout said second band.

14. The system according to claims 12 or 13 wherein the nth second carrier signal frequency in order of increasing frequencies in said second band is represented by $f_{Sn} = f_{Sl} + F(n-1)$, where F is the frequency spacing between adjacent carrier signal frequencies in said first and second bands and $f_{Sl}$ is the frequency of the lowest-frequency second carrier signal.

15. The system according to claim 14 wherein the nth first carrier signal frequency in order of increasing frequencies in said first band is represented by $f_{Cn} = 2f_{Sl} + FN + F(n-1)$, where N is equal to the number of said remote stations.

16. The system according to claim 15 wherein the frequency of said translating signal is represented by $f_X = f_{Sl} + FN$.

17. The system according to claim 16 wherein said means for providing said translating signal comprises:
means at said central location for generating a frequency-stable common source signal having a frequency twice that of said translating signal and higher than the highest first carrier signal frequency by the amount F;
means for transmitting said common source signal to said remote stations via said common transmission line; and
means at each remote station for receiving said common source signal and frequency-dividing it by two to provide said translating signal.

18. The system according to claim 17 wherein said means for generating said first carrier signals and said common source signal includes:
means for generating a frequency-stable clock signal at a higher frequency than that of all of said first carrier, second carrier and common source signals; and
means for deriving from said clock signal all of said first carrier signals and said common source signals.

19. The system according to claim 16 wherein N=16, $f_{Sl}=8$ kilohertz, and F=4 kilohertz.

20. The system according to claim 19 wherein the derived single sidebands of said first carrier signals and the derived single sidebands of said second carrier signal are upper sidebands.

21. The system according to claim 12 wherein said means for providing said translating signal comprises:
means at said central location for generating a common source signal having a frequency which is an integral multiple of the translating signal frequency and higher than frequencies of any of said first and second carrier signals by at least the bandwidth of said intelligence signals;

means for transmitting said common source signal to each remote station via said common transmission line; and means at each remote station for receiving said common source signal and frequency-dividing it by a predetermined factor to provide said translating signal, said predetermined factor being such that the frequency of said translating signal falls between said first and second bands.

22. The system according to claim 21 wherein said means for generating said first carrier signals and said common source signal includes:

means for generating a frequency-stable clock signal at a higher frequency than that of all of said first carrier, second carrier and common source signals; and means for deriving from said clock signal all of said first carrier signals and said common source signals.

* * * * *